(12) United States Patent
Abramov et al.

(10) Patent No.: US 10,759,000 B2
(45) Date of Patent: Sep. 1, 2020

(54) MULTIBEAM FIBER LASER SYSTEM

(71) Applicants: Andrey Abramov, Oxford, MA (US); Valentin Fomin, Oxford, MA (US); Eugene Shcherbakov, Oxford, MA (US); Holger Mamerow, Oxford, MA (US); Dmitri Yagodkin, Oxford, MA (US)

(72) Inventors: Andrey Abramov, Burbach (DE); Valentin Fomin, Burbach (DE); Eugene Shcherbakov, Burbach (DE); Holger Mamerow, Burbach (DE); Dmitri Yagodkin, Burbach (DE)

(73) Assignee: IPG PHOTONICS CORPORATION, Oxford, MA (US)

( * ) Notice: Subject to any disclaimer, the term of this patent is extended or adjusted under 35 U.S.C. 154(b) by 184 days.

(21) Appl. No.: 15/426,540

(22) Filed: Feb. 7, 2017

(65) Prior Publication Data
US 2019/0118297 A1    Apr. 25, 2019

Related U.S. Application Data

(63) Continuation of application No. PCT/US2015/045037, filed on Aug. 13, 2015.
(Continued)

(51) Int. Cl.
*G02B 6/42* (2006.01)
*B23K 26/06* (2014.01)
(Continued)

(52) U.S. Cl.
CPC .......... *B23K 26/24* (2013.01); *B23K 26/0604* (2013.01); *B23K 26/0608* (2013.01); *B23K 26/0622* (2015.10); *B23K 26/0626* (2013.01); *B23K 26/0884* (2013.01); *B23K 26/127* (2013.01); *B23K 26/1464* (2013.01); *B23K 26/21* (2015.10); *G02B 6/43* (2013.01); *B23K 2101/34* (2018.08); *B23K 2103/04* (2018.08);
(Continued)

(58) Field of Classification Search
CPC combination set(s) only.
See application file for complete search history.

(56) References Cited

U.S. PATENT DOCUMENTS 3,621,181 A * 11/1971 Young .................... B23K 26/22
219/121.63
5,048,911 A * 9/1991 Sang ..................... A61N 5/0601
359/618
(Continued)

*Primary Examiner* — Dana Ross
*Assistant Examiner* — Lawrence H Samuels
(74) *Attorney, Agent, or Firm* — Yuri B. Kateshov, Esq.; Caroline J. Roush, Esq.

(57) ABSTRACT

The present invention provides a fiber laser system that delivers from a single processing cable a multibeam output. The present invention allows for controlling multiple fiber laser modules and delivering their respective outputs in a pre-determined sequence but in a single processing cable, thereby providing multiple processing steps on a work piece that heretofore required separate optics for each beam. Custom fiber laser systems that combine processing steps tailored for a specific industrial application such as pre-heating, cutting, cleaning, welding, brazing, ablating, annealing, cooling, polishing and the like can be readily provided because of the present invention.

10 Claims, 10 Drawing Sheets

Related U.S. Application Data

(60) Provisional application No. 62/036,740, filed on Aug. 13, 2014.

(51) Int. Cl.

| | | |
|---|---|---|
| *H01S 3/00* | (2006.01) | |
| *B23K 26/24* | (2014.01) | |
| *B23K 26/0622* | (2014.01) | |
| *G02B 6/43* | (2006.01) | |
| *B23K 26/21* | (2014.01) | |
| *B23K 26/08* | (2014.01) | |
| *B23K 26/12* | (2014.01) | |
| *B23K 26/14* | (2014.01) | |
| *B23K 103/04* | (2006.01) | |
| *B23K 103/10* | (2006.01) | |
| *B23K 101/34* | (2006.01) | |
| *B23K 103/08* | (2006.01) | |
| *B23K 103/14* | (2006.01) | |

(52) U.S. Cl.
CPC ...... *B23K 2103/05* (2018.08); *B23K 2103/08* (2018.08); *B23K 2103/10* (2018.08); *B23K 2103/14* (2018.08)

(56) References Cited

U.S. PATENT DOCUMENTS

| | | | | |
|---|---|---|---|---|
| 5,396,570 A * | 3/1995 | Jenkins | ........... | G02B 6/2813 385/146 |
| 5,418,869 A * | 5/1995 | Seike | ........... | G02B 6/264 385/15 |
| 5,485,481 A * | 1/1996 | Ventrudo | ........... | G02B 6/02076 372/108 |
| 5,589,684 A * | 12/1996 | Ventrudo | ........... | G02B 6/02076 250/225 |
| 5,841,797 A * | 11/1998 | Ventrudo | ........... | G02B 6/02076 372/6 |
| 6,041,072 A * | 3/2000 | Ventrudo | ........... | G02B 6/02076 372/102 |
| 6,167,075 A * | 12/2000 | Craig | ........... | H01S 3/094003 372/32 |
| 6,229,940 B1 * | 5/2001 | Rice | ........... | G02B 6/2848 257/98 |
| 7,705,290 B2 * | 4/2010 | Liebman | ........... | G01S 17/02 250/227.14 |
| 7,738,751 B1 * | 6/2010 | Minden | ........... | G02B 6/04 372/6 |
| 8,670,180 B2 * | 3/2014 | Chann | ........... | G02B 27/0905 359/556 |
| 8,981,256 B2 * | 3/2015 | Stein | ........... | B29C 65/1687 156/380.9 |
| 9,393,644 B2 * | 7/2016 | Bruck | ........... | C23C 24/106 |
| 2001/0045419 A1 * | 11/2001 | Dunsky | ........... | B23K 26/02 219/121.76 |
| 2002/0153422 A1 * | 10/2002 | Tsikos | ........... | G06K 7/10742 235/454 |
| 2004/0081396 A1 * | 4/2004 | Komine | ........... | G02B 6/4204 385/33 |
| 2004/0264864 A1 * | 12/2004 | Ito | ........... | G02B 6/2804 385/46 |
| 2005/0036526 A1 * | 2/2005 | Doerr | ........... | G02B 6/12011 372/20 |
| 2005/0219518 A1 * | 10/2005 | Korngut | ........... | G01N 21/47 356/237.2 |
| 2006/0197013 A1 * | 9/2006 | Liebman | ........... | G01S 7/48 250/234 |
| 2007/0195850 A1 * | 8/2007 | Schluter | ........... | H01S 5/4025 372/50.124 |
| 2007/0223552 A1 * | 9/2007 | Muendel | ........... | G02B 6/12004 372/50.12 |
| 2010/0061410 A1 * | 3/2010 | Platonov | ........... | G02B 6/32 372/21 |
| 2011/0305249 A1 * | 12/2011 | Gapontsev | ........... | B23K 26/043 372/6 |
| 2011/0310921 A1 * | 12/2011 | Chann | ........... | G02B 27/0905 372/70 |
| 2012/0266814 A1 * | 10/2012 | Clark | ........... | B23K 26/0643 118/620 |
| 2013/0025325 A1 * | 1/2013 | Piwczyk | ........... | H01L 21/67115 65/392 |
| 2014/0124487 A1 * | 5/2014 | Stein | ........... | B29C 65/1687 219/121.63 |
| 2014/0209577 A1 * | 7/2014 | Bruck | ........... | C23C 24/106 219/121.64 |

* cited by examiner

FIG. 7
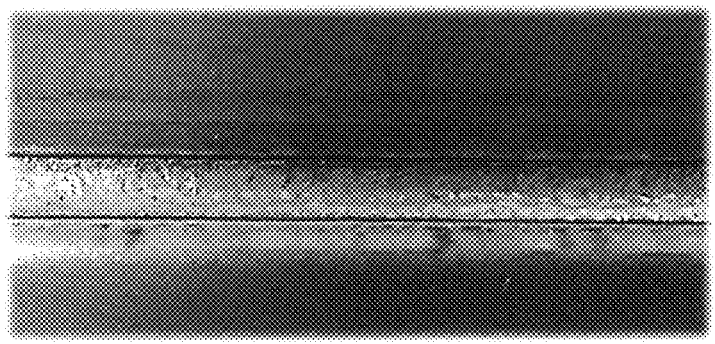
FIG. 7A
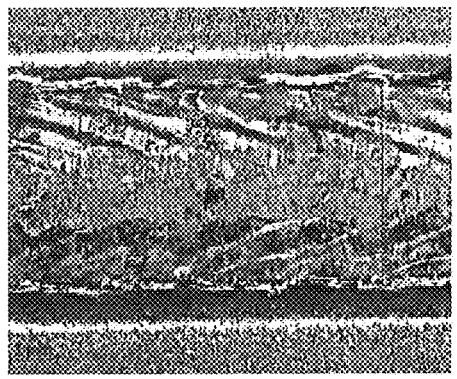
FIG. 7B
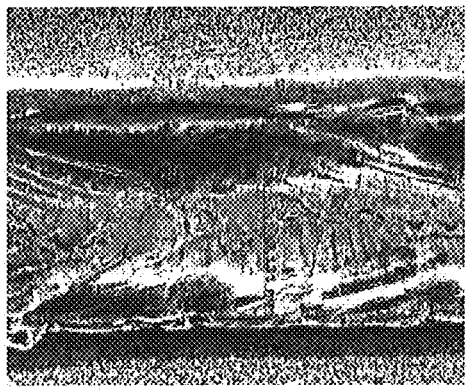
FIG. 7C
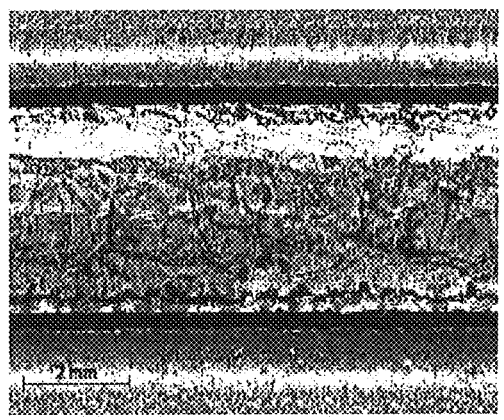
FIG. 7D FIG. 8
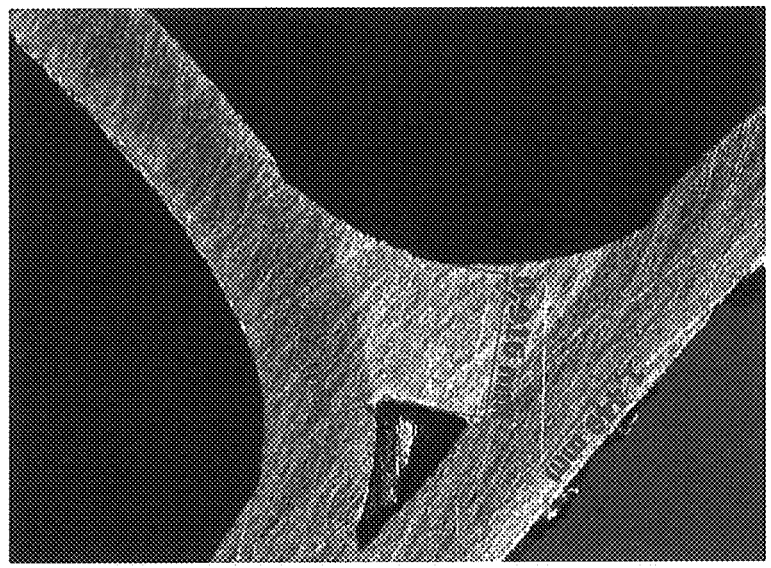
FIG. 8A
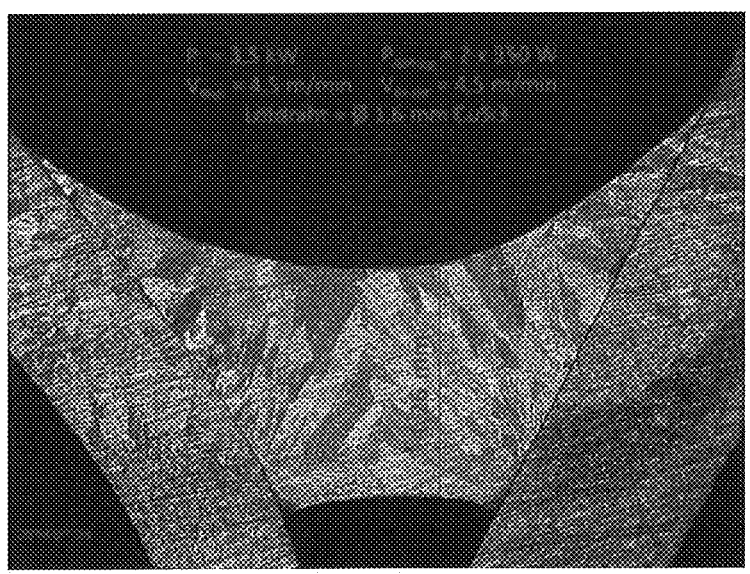
FIG. 8B FIG. 9
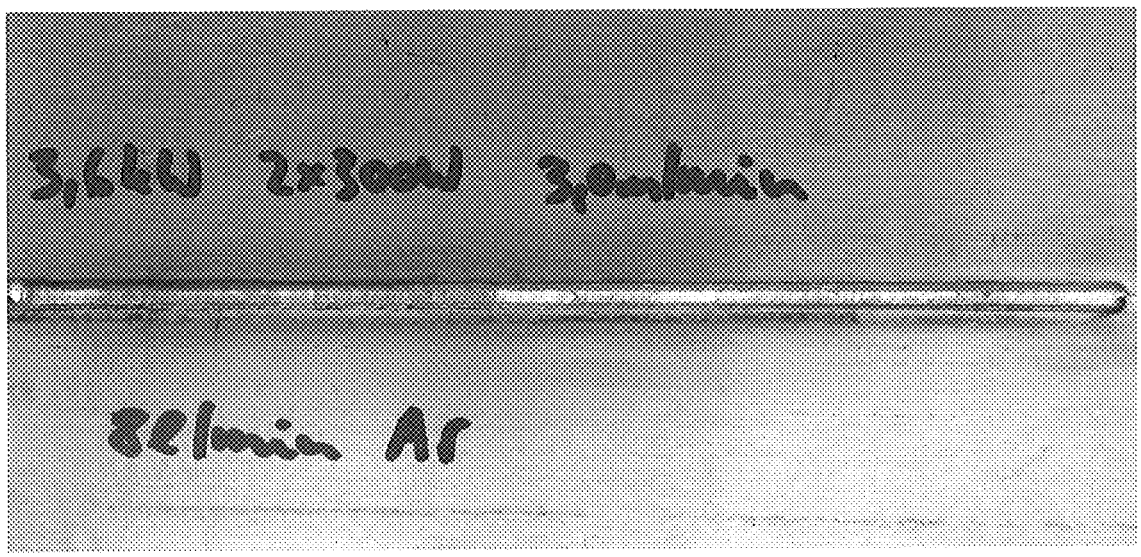
FIG. 10
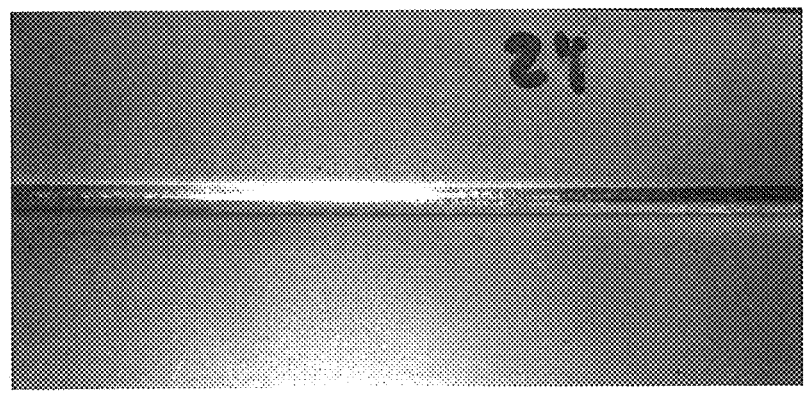
FIG. 10A
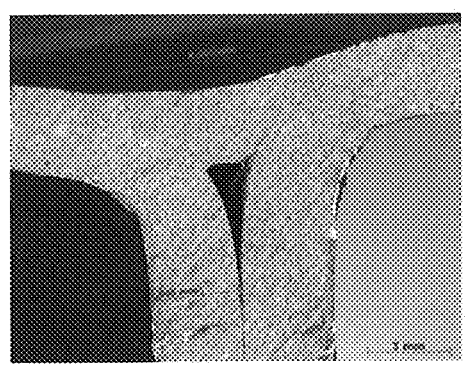
FIG. 10B

MULTIBEAM FIBER LASER SYSTEM

BACKGROUND OF THE DISCLOSURE

Field of the Disclosure

The disclosure relates to coupling the light from a plurality of fiber laser devices into a single optical component and controlling the output from such laser devices such that distinct fiber laser outputs may be delivered downstream to a work piece or to an optic.

Background of the Disclosure

Use of multiple beam devices for materials processing is quite common. For example, single optical fibers delivering a single laser output can be in optical communication with diffractive optical elements that can provide an incoherent output targeted to multiple spots, as found at http://www-.tailorweld.eu/overview/concept. Unfortunately, this configuration only works if the application requires each of the locations on the work piece be subjected to a laser beam, including wavelength, power and pulse width, identical to the other. What is needed is a laser system that can deliver multiple beams to a work piece wherein the multiple beams are incoherent and distinct with respect to their properties.

The fiber laser has developed to the point that there are multiple wavelengths available in a wide swath of powers, pulse widths and rep rates. Indeed, numerous applications have developed that take advantage of the variety of laser light available. For example, in WO/2013/019204, the inventors considered a multi-laser system to remove the coating of stainless steel and then cut the steel, all with a combined beam. Ultimately, a single laser system was found that rendered this multi-laser system un-necessary. However, a stumbling block in connection with its commercialization was the need for sophisticated optics in the laser head to deliver the combined process beam. In addition, since the lasers were separate systems, use of the CPU to control the systems was found not to be a dynamic enough control environment to alter the processing parameters of the lasers to meet the application requirements.

Nevertheless, the concept of combining multiple laser outputs is well developed, including combining distinct laser outputs into a single fiber optic cable. U.S. Pat. No. 5,048,911 provides the use of mirrors to create parallel outputs that are then subsequently focused into a single fiber optic cable that would deliver the parallel outputs. However, such systems require multiple optics that introduce complexity, further increasing their cost not to mention opportunities for the degradation of the output.

U.S. Pat. No. 6,229,940 requires the uses of multiple couplers and lenses to produce the incoherent laser light outputs that are combined in a cascade approach. In addition, its limitation to only single mode light does not reflect the wide variety of applications where multi-mode light is acceptable, if not desirable.

While the prior art provides aligned fiber optical arrangements, they are inconsistent with the needs of the industrial environment where cost sensitivities and the need for robustness make such prior art solutions untenable. Indeed, US20040081396 required a registration guide to align the fibers and downstream optics to collimate the beams.

In addition, while fiber to optic bonding has been taught, they are combined with a lens to compensate for collimating effects, where the optic is a lens or where the array of fibers and their respective outputs are combined, such as in U.S. Pat. No. 7,130,113.

A need exists for a multi-beam laser system configured through a low-cost but robust optic that can provide incoherent laser beams in a predetermined configuration in which the parameters of the output can be controlled.

SUMMARY OF THE DISCLOSURE

The present invention provides a fiber laser system for producing independently controlled multiple incoherent laser beam outputs. In a preferred embodiment of the invention, the respective fibers for the multiple beam outputs are fused to a bulk optic adjacent to the terminal end of a processing fiber.

The present invention allows for the combination of different types of laser output to concurrently process a work piece, the variations, including beam characteristics including spot shape, wavelength, wavelength bandwidth, pulsed or continuous wave, or quasi-continuous wave operation, pulse width, peak power, average power, rep rate and beam parameters such as beam quality or $M^2$ measurement; that is, single mode, low mode (less than 20 higher order modes) or greater multimode output.

As to specific applications, the present invention can allow for a variety of configurations of fiber to provide a variety of process steps delivered by a single processing cable, including, but not limited to one or more of the following industrial process steps: pre-heating, ablating, cleaning, cutting, welding, brazing, annealing, controlled cooling, smoothing, polishing etc.

For a single process application, the present invention may provide a sequence of fiber spots that would allow for an increase in speed and/or quality for performing the process.

As the cost of an additional module and fiber would be incremental, it follows that current single processes would add finishing processes to minimize post handling. For example, adding a smoothing or polishing step after cutting to eliminate debris and cracking.

The present invention addresses a specific need when performing processing steps on three dimensional objects because laser speed and power settings need to be adjusted when traversing a non-flat surface to avoid under or over exposure to the output and this system will allow for dynamic control of each distinct laser output as it traverses such three dimensional surfaces.

The present invention provides for methods of joining work pieces from a laser system having a multiple fiber laser beam output. In particular it provides a method of a welding a plurality of work pieces from a laser system having a multiple fiber laser beam output. First one must provide a laser system that includes at least two fiber laser modules configured to operate independently and provide at least two fiber laser outputs. It follows that each fiber laser output may be the result of the upstream combination of multiple fiber lasers. Each fiber laser output is configured to deliver an amount of energy sufficient to contribute to a pattern of material interaction, the combination of each laser output contributing to foiin a pre-determined weld of sufficient strength. Such material interaction may include surface material displacement. "Surface material displacement" may include cleaning the surface of a work piece, removal of a naturally occurring oxidation layer, removal of a coating from the surface of the work pieces or creating high aspect ratio structures. The purpose of such material displacement is to improve the conditions for creating the weld by removing contaminants or layers of material that weaken the weld if left intact. In other circumstances, the creation of high aspect ratio surfaces facilitate the absorption of the fiber laser output configured to weld the work pieces. The present invention provides a substantial benefit over the the prior art in that it allows for suface material displacement and the joining of work pieces in a single process.

While it is contemplated that all manner of welds known to those of ordinary skill in the art may be addressed by the present invention, a preferred embodiment would be the creation of a seam weld between two work pieces.

As those ordinary in the skill in the art are aware, the creation of seam welds may be aided by the use wire stock to assist in filling the seam. The present invention contemplates feeding wire stock at a certain velocity in combination with exposing the work pieces to the fiber laser outputs to create a pre-determined weld of sufficient strength.

As those of ordinary skill in the art are aware, the creation of seam welds may be aided by exposing the work pieces to a gas. Such exposure can include shielding. Gases including Argon are well known to those of skill in the art.

While the method of the present invention is not limited to any specific weld able materials, it does provide the ability to weld materials that heretofore were difficult to weld. In particular, 6000 aluminum alloys, alloyed steels such as high strength steels and coated steels benefit greatly from the present invention. Other welding challenges regarding amorphous steels, stainless steels and titanium could be resolved with the method of the present invention.

BRIEF DESCRIPTION OF THE DRAWINGS

The above and other aspects, features and advantages of the disclosure will become more readily apparent with the aid of the following drawings, in which:

FIG. 7 provides a comparison of a brazing sample created by a three spot laser system using the present invention with two different brazing samples created by a single spot laser system.

FIG. 8 provides two different brazing samples created by the present invention.

FIG. 9 provides a seam weld of type 6000 aluminum alloy created without a filling wire.

FIG. 10 provides a seam weld of type 6000 aluminum alloy created with a wire filler.

SPECIFIC DESCRIPTION

Figure 1A:
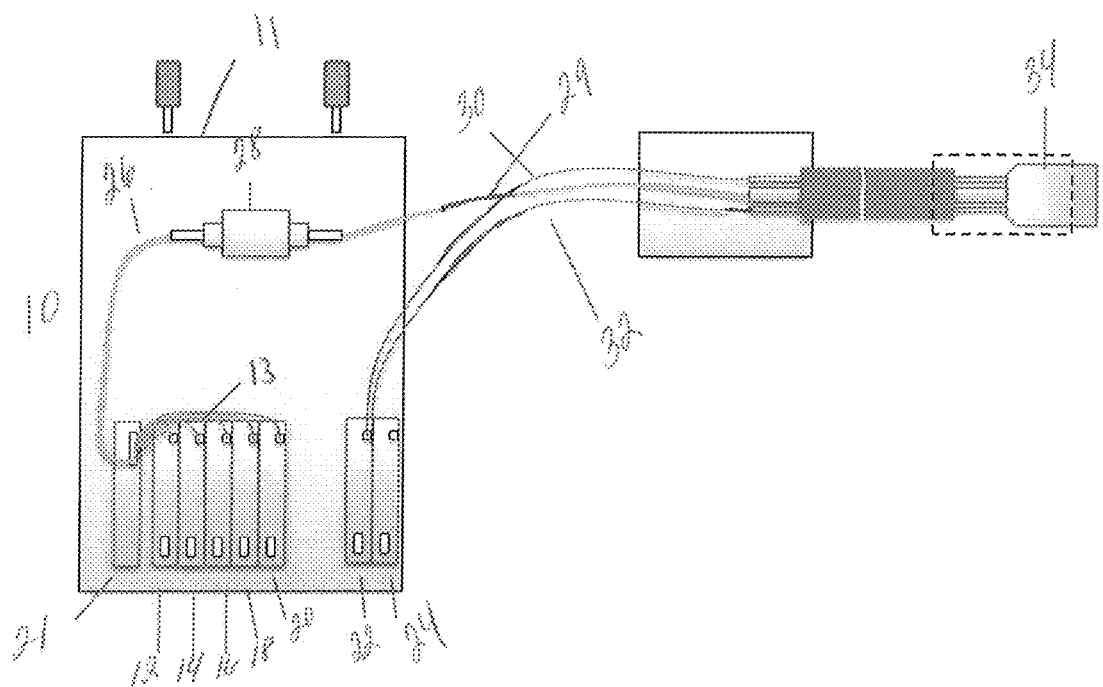
FIG. 1a is a partial sectional view of a multibeam laser system of the present invention wherein the bulk optic is embedded in the processing cable.

Reference will now be made in detail to embodiments of the invention. Wherever possible, same or similar reference numerals are used in the drawings and the description to refer to the same or like parts or steps. The drawings are in simplified form and are not to precise scale. For purposes of convenience and clarity only, directional (up/down, etc.) or motional (forward/back, etc.) terms may be used with respect to the drawings. The term "couple" and similar tams do not necessarily denote direct and immediate connections, but also include connections through intermediate elements or devices.

FIG. 1a sets forth one embodiment of the present invention, whereby a laser system 10 delivers three different outputs through delivery optical fibers 29, 30 and 32 that are coupled to a bulk optic. Preferably, the delivery optical fibers 29, 30 and 32 are coupled to the bulk optic 34 by being fused to the bulk optic 34. Preferably the delivery optical fibers and the bulk optic 34 are made from identical materials, such as quartz, such that they have identical refractive indices. More preferably, the refractive index of the bulk optic 34 and each of the delivery optical fibers is 1.45.

The housing 11 of laser system 10 contains laser modules 12, 14, 16, 18, 20, 22 and 24. In the present invention, laser modules 12, 14, 16, 18 and 20 provide identical output in delivery optical fibers 13, the output thereof combined in combiner 21. This combiner 21 is more fully described in International Patent Application No. PCT/US2014/018688 owned by Applicant and herein incorporated by reference in its entirety. The combiner 21 has an output fiber 26 in optical communication with a fiber coupler 28.

In this embodiment the laser modules 12, 14, 16, 18 and 20 provide an output of 1070 nm as their active fibers are Yb, but any variety of wavelengths is contemplated, such that Er, Th, Ho, doped fibers, or some combination thereof, are contemplated not to mention fiber lasers in which the output is frequency shifted by virtue of non-linear optical crystals, Raman fibers and the like.

While the light produced in the present invention is multi-mode as that is what the application demanded, single mode light could also be provided as the particular application requires.

In addition, the laser modules operated in continuous wave, but pulsed lasers or quasi-continuous wave lasers could be substituted.

Laser modules 22 and 24, providing a different output in CW and QCW operation, are coupled to the bulk optic 34 by virtue of their respective delivery optical fibers 30 and 32. While optical fibers 30 and 32 are multimode, the present invention contemplates the use of multimode, single mode or a mixture thereof that may be coupled to bulk optic 34.

Figure 1B:
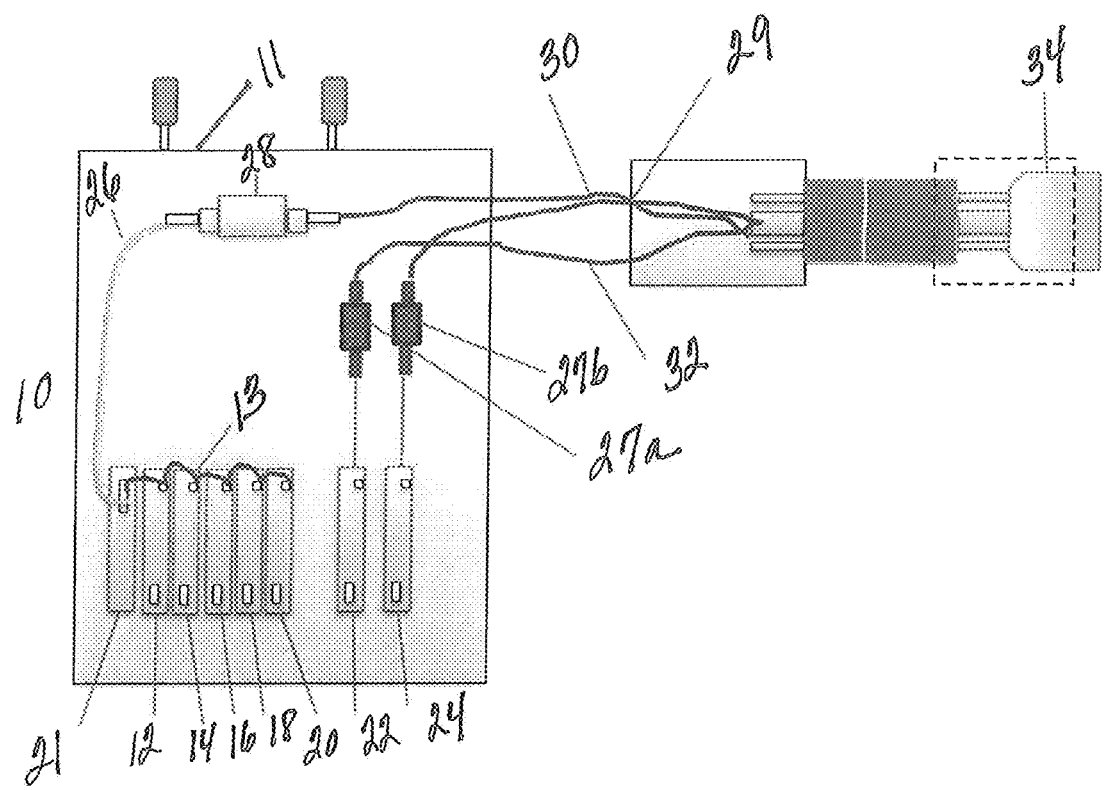
FIG. 1b is another partial sectional view of a multibeam laser system of the present invention wherein the bulk optic is embedded in the processing cable.

FIG. 1b sets forth another embodiment of the present invention that differs from FIG. 1a in that the respective outputs of fiber laser modules 22 and 24 use couplers 27a and 27b similar to the output of combiner 21 is coupled to coupler 28. Such an embodiment provides a laser system that is more easily serviceable.

Figure 2:
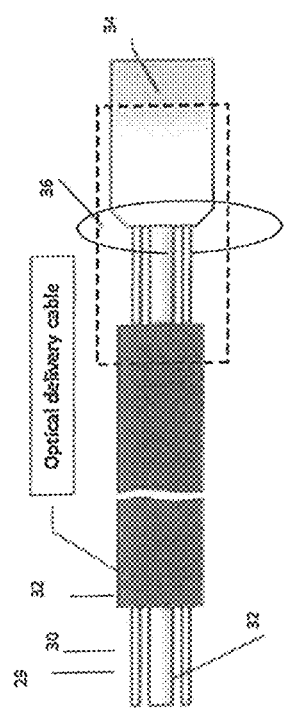
FIG. 2 is a close up and a partial sectional view of the bulk optic and delivery fibers of the system of FIG. 1.

FIG. 2 provides an exploded view of the connection of the delivery optical fibers 29, 30 and 32 to the bulk optic 34. In this embodiment, the bulk optic 34 and delivery optical fibers 29, 30 and 32 are surrounded by an outer covering 33 to form a processing cable. The respective fibers are coupled to the bulk optic 34. More preferably, the respective fibers are fused to the bulk optic 34 at a surface 36.

Figure 3:
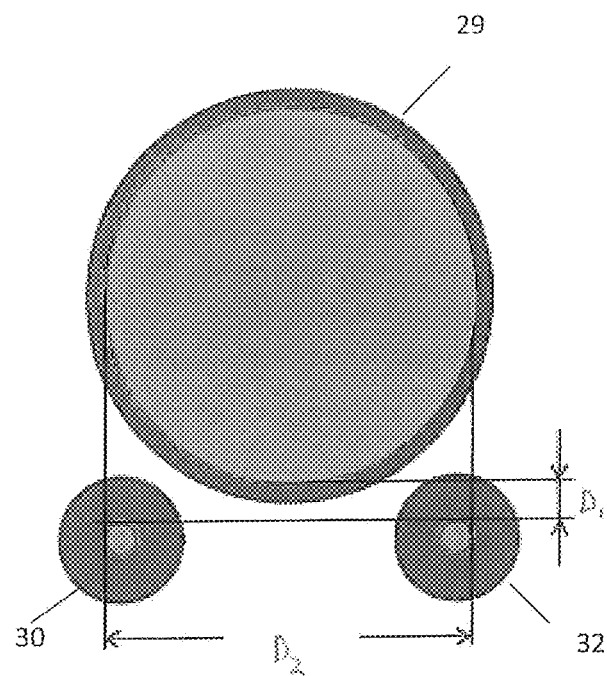
FIG. 3 is an exemplary cross-sectional view of individual delivery fibers from the laser modules.

FIG. 3 provides a cross section of the delivery optical fibers 29, 20 and 32 proximate to their fusion location 36 on the bulk optic 34. As one of ordinary skill in the art can appreciate, the three fibers are spaced apart with respect to each other in a pre-determined arrangement. In the embodiment of the present invention, distance D1 is between 50 and 100 microns and D2 is 590 to 600 microns. Delivery optical fibers 30 and 32 have core diameters of 50 microns and external diameters of 200 microns. Optical delivery fiber 29 has a core diameter of 600 microns. The present invention is not limited to this embodiment as it contemplates the use of multimode delivery fibers having a core diameter in the range of 250 to 600 microns.

The present invention contemplates at least two fibers, with configurations limited by the size limits of the bulk optic 34. In addition, as delivery optical fibers are now manufactured in numerous shapes, it is contemplated that different shaped fibers, as well as diameters, may be used.

Furthermore, the present invention contemplates the use of single mode fibers, as well as the multi-mode fibers provided herein, and mixtures thereof as the optical delivery fibers to be coupled into the bulk optic 34, the characteristics thereof being determined by the particular application.

While not shown in FIG. 3, the present invention contemplates the use of alignment devices to insure that the connector at the terminus of the processing cable housing bulk optic 34 presents the laser beams in the pre-determined sequence based upon their location on the bulk optic 34. For example, if the work piece requires the output from delivery optical fibers 30 and 32, before being exposed to the output from optical delivery fiber 29, the bulk optic 34 will need to be aligned accordingly when it is fixed to a connector.

Figure 4:
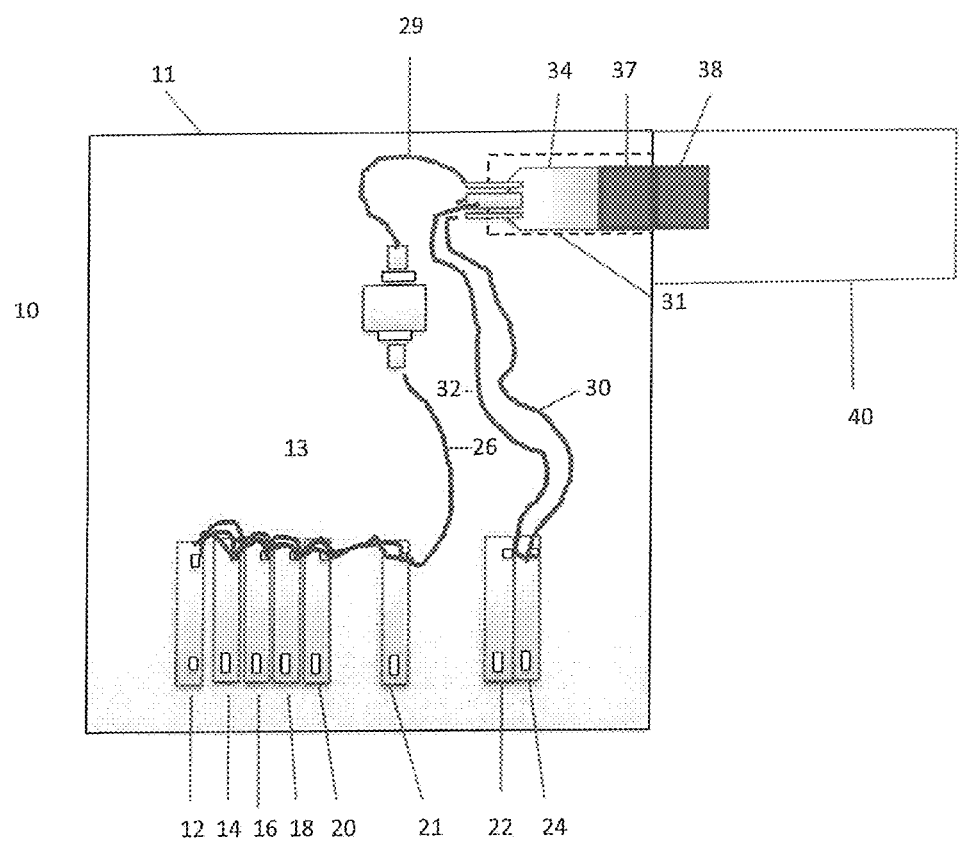
FIG. 4 is a partial sectional view of a multibeam laser system of the present invention wherein the bulk optic is embedded inside a housing.

FIG. 4 presents a laser system 10 in which the bulk optic 34 is contained within the housing 11 and a laser head 40 would deliver the multi beam output to a work piece. This figure further provides a connector system including respective connector portions 37 and 38. Those of ordinary skill in the art would understand and know of the numerous different connector systems available in the fiber optic space as well as the variety of aligning fixtures one could use to insure the orientation of the bulk optic 34 provides the output from the delivery optical fibers in the pre-determined configuration to the laser head 40.

FIG. 4 further provides a housing 31 to contain the bulk optic 34 and the delivery optical fibers.

Figure 5:
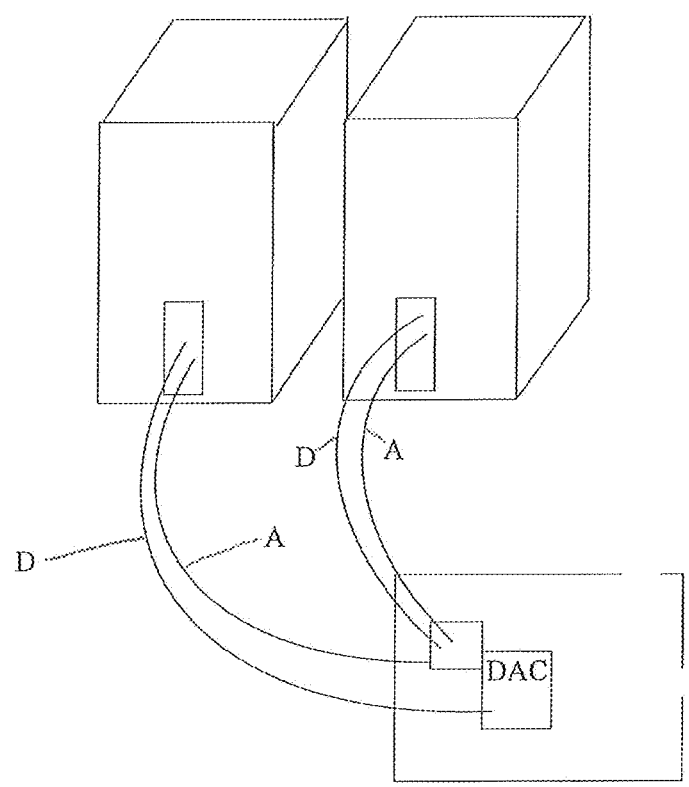
FIG. 5 provides an analog to digital control schematic for a system of the present invention.

The laser modules of the present invention may preferably be operable independent from each other, but nevertheless may preferably be subject to a unifying control schematic to allow for dynamic adjustments to the outputs therefrom. FIG. 5 provides a standard control format where the independently-operated laser modules are further controlled through the use of a digital to analog controller. This will allow for the control of the independently operate laser modules in parallel. Those of ordinary skill in the art would recognize that a variety of control schemes could operate this preferred embodiment of the present invention.

Figure 6:
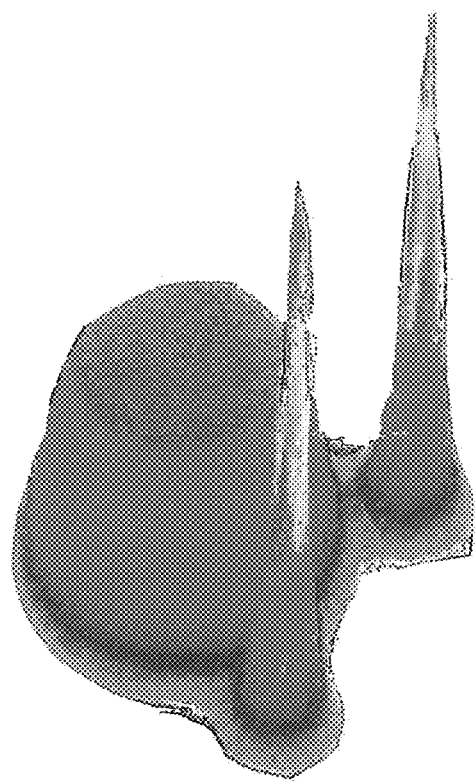
FIG. 6 is an image of the beam structure of the optical output focused on a work piece where fibers have been configured according to the embodiment of the present invention found in FIG. 3.

FIG. 6 is an image of the beam structure of the optical output of the fiber configuration set forth in FIG. 3 upon impact with the work piece. It is clear that the beams are substantially incoherent; thereby they each substantially maintain their output characteristics and therefore can provide the processing step contemplated for the specific application.

Individual processing steps that can be combined can include pre-heating, cleaning, ablating, cutting, brazing, welding, annealing and smoothing.

FIG. 7 provides four images of the brazing of hot-dipped coated steel. FIG. 7a provides a higher elevation view of FIG. 7d, which was created by the present invention. Specifically, the fibers, two being cleaning spots of 100 micron diameter fiber and being fed by a continuous wave laser having 0.85 kW of average power and a third fiber being a main spot of 600 micron diameter and being fed by a continuous wave laser having 3.5 kW of average power. FIGS. 7b and 7c were created with single spot laser systems with main spot powers of 3.5 Kw and 4.3 kW, respectively.

FIG. 8 provides two images of different zinc coated steel brazing samples created by a three fiber version of the present invention where the two cleaning spots had 100 micron diameters and the main spot had a 600 micron diameter. FIG. 8a provides an electro-galvanized zinc coated steel brazing sample. To create this braze, two 450 W CW lasers were fed to the two cleaning spots and 3.5 kW CW laser was fed to the main spot. The robot speed was 4.5 meters per minute and the brazing material, 1.6 mm CuSi3 was fed at the same speed.

FIG. 9 provides a seam weld of two work pieces comprising different aluminum alloys of different thicknesses. One work piece was 1.2 mm thick AlMg 0,4 Si 1, 2 and the other was 1.5 mm thick AlMg 5,3 Mn. They were welded with a three spot configuration with all of the spots being 100 microns in diameter. The two lead fibers each were fed by 300 W CW lasers and the trailing spot had a 3.6 kW CW laser feeding it. The robot speed was 3 meters per minute and a shield gas of Argon was provided at 8 liters per minute.

FIG. 10 provides two images of a seam weld of type 6000 aluminum alloy work pieces created with wire filler. They were welded with a three spot configuration with all of the spots being 100 microns in diameter. The two lead fibers each were fed by 450 W CW lasers and the trailing spot had a 3.6 kW CW laser feeding it. The feeding speed of the filler wire was 3.5 meter per minute while the robot speed was 4.4 meters per minute and a shield gas of Argon was provided at 10 liters per minute.

Those skilled in the art will recognize or be able to ascertain using no more than routine experimentation many equivalents to the specific embodiments of the invention described herein. The disclosed schematics can be used with any light imaging system, but the impetus for the presently disclosed structure lies in multibeam fiber laser systems. It is therefore to be understood that the foregoing embodiments are presented by way of example only and that within the scope of the appended claims and equivalents thereto, the invention may be practiced otherwise than as specifically described. The present disclosure is directed to each individual feature, system, material and/or method described herein. In addition, any combination of two or more such features, systems, materials and/or methods, if such features, systems, materials and/or methods are not mutually inconsistent, is included within the scope of the present invention.

The invention claimed is:

1. A method of providing a dynamically changeable multiple fiber laser beam output from a single processing cable, the method comprising:
   providing a plurality of fiber laser modules configured to operate in parallel and further configured to provide at least two distinct fiber laser outputs each in their own respective fiber, at least one of the at least two distinct fiber laser outputs differing by one or more beam characteristics from at least one other of the at least two distinct fiber laser outputs;
   providing a control system configured to control the characteristics of the at least two distinct fiber laser outputs;
   fusing a bulk optic to the fibers, thereby coupling the distinct fiber laser outputs into the bulk optic so that the distinct fiber laser outputs propagate through the bulk optic and output therefrom being substantially spaced apart; and providing an optical component to receive the distinct fiber laser outputs, the optical component being in optical communication with a work piece configured to receive the distinct fiber laser outputs, wherein each distinct fiber laser output may be controlled dynamically and concurrently with respect to other distinct fiber laser outputs during operation.

2. The method of claim 1, wherein the hulk optic is housed in a processing cable.

3. A method of welding a plurality of work pieces from a laser system having a multiple fiber laser beam output, the method comprising:

provideing a laser system including at least two fiber laser modules configured to operate independently and provide at least two distinct fiber laser outputs delivered though respective fibers, at least one of the respective outputs differing by one or more beam characteristics from at least one other respective output: and fusing the fibers to a bulk optic configured to output the distinct fiber laser outputs as substantially spaced apart, wherein each fiber laser output is configured to deliver an amount of energy sufficient to contribute to a pattern of material interaction, the combination of each laser output contributing to form a pre-determined weld of sufficient strength.

4. The method of claim 3, wherein the material interaction includes surface material displacement.

5. The method of claim 3, wherein the pre-determined weld is a seam weld.

6. The method of claim 5, wherein the method includes feeding wire stock at a certain velocity to assist in creating the pre-determined seam weld.

7. The method of claim 3 further comprises exposing the work pieces to a gas.

8. The method of claim 3, wherein the work pieces comprises an aluminum alloy.

9. The method of claim 3, wherein the work pieces comprise a steel alloy.

10. The method of claim 9, wherein the work pieces comprise a high strength steel alloy.

* * * * *